US011651129B2

(12) United States Patent
Wang et al.

(10) Patent No.: US 11,651,129 B2
(45) Date of Patent: May 16, 2023

(54) SELECTING A SUBSET OF TRAINING DATA FROM A DATA POOL FOR A POWER PREDICTION MODEL

(71) Applicant: Synopsys, Inc., Mountain View, CA (US)

(72) Inventors: Chaofan Wang, Santa Clara, CA (US); Vaibhav Jain, Cupertino, CA (US); Shekaripuram Venkatesh, Los Altos, CA (US); Solaiman Rahim, San Francisco, CA (US)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 17/520,437

(22) Filed: Nov. 5, 2021

(65) Prior Publication Data

US 2022/0138388 A1 May 5, 2022

Related U.S. Application Data

(60) Provisional application No. 63/110,261, filed on Nov. 5, 2020, provisional application No. 63/110,262, filed on Nov. 5, 2020.

(51) Int. Cl.
*G06F 30/30* (2020.01)
*G06F 30/33* (2020.01)
*G06F 30/27* (2020.01)
*G06F 30/337* (2020.01)
*G06F 30/333* (2020.01)
(Continued)

(52) U.S. Cl.
CPC ............. *G06F 30/33* (2020.01); *G06F 30/27* (2020.01); *G06F 18/24137* (2023.01); *G06F 30/30* (2020.01); *G06F 30/333* (2020.01); *G06F 30/337* (2020.01); *G06F 2119/06* (2020.01);
(Continued)

(58) Field of Classification Search
None
See application file for complete search history.

(56) References Cited

U.S. PATENT DOCUMENTS 8,458,116 B2 * 6/2013 Lupetini ............. G05B 13/026
716/109
10,192,016 B2 * 1/2019 Ng ........................ G06F 30/327
(Continued)

OTHER PUBLICATIONS

Zhou, et al. "PRIMAL: Power Inference using Machine Learning" DAC '19, Jun. 2-6, 2019, c 2019 Association for Computing Machinery.
(Continued)

*Primary Examiner* — Leigh M Garbowski
(74) *Attorney, Agent, or Firm* — Patterson + Sheridan, LLP

(57) ABSTRACT

A method includes generating a plurality of vector sequences based on input signals of an electric circuit design and encoding the plurality of vector sequences. The method also includes clustering the plurality of encoded vector sequences into a plurality of clusters and selecting a set of encoded vector sequences from the plurality of clusters. The method further includes selecting a first set of vector sequences corresponding to the selected set of encoded vector sequences, selecting a second set of vector sequences from the plurality of vector sequences not in the first set of encoded vector sequences, and training, by a processing device, a machine learning model to predict power consumption using the first and second sets of vector sequences.

19 Claims, 8 Drawing Sheets

(51) Int. Cl.
  *G06N 3/02* (2006.01)
  *G06N 3/08* (2023.01)
  *G06F 119/06* (2020.01)
  *G06F 18/2413* (2023.01)
  *G06N 3/045* (2023.01)

(52) U.S. Cl.
  CPC .............. *G06N 3/02* (2013.01); *G06N 3/045* (2023.01); *G06N 3/08* (2013.01)

(56) References Cited

U.S. PATENT DOCUMENTS

| | | | |
|---|---|---|---|
| 10,867,091 B1* | 12/2020 | Oh ........................ | G06F 30/331 |
| 11,455,168 B1* | 9/2022 | Potyraj ................ | G06F 9/3877 |
| 2007/0276645 A1* | 11/2007 | Veller .................... | G06F 30/33 |
| | | | 703/18 |

OTHER PUBLICATIONS

Zhang, et al., "GRANNITE: Graph Neural Network Inference for Transferable Power Estimation" © 2020 IEEE.

Yang, et al. "Early Stage Real-Time SoC Power Estimation Using RTL Instrumentation" © 2015 IEEE.

Chung. et al. "A Recurrent Latent Variable Model for Sequential Data" Submitted on Jun. 7, 2015.

Wu, et al., "Offline EEG-Based Driver Drowsiness Estimation Using Enhanced Batch-Mode Active Learning (EBMAL) for Regression" 2016 IEEE.

Dongrui Wu, "Pool-Based Sequential Active Learning for Regression" May 12, 2018.

* cited by examiner

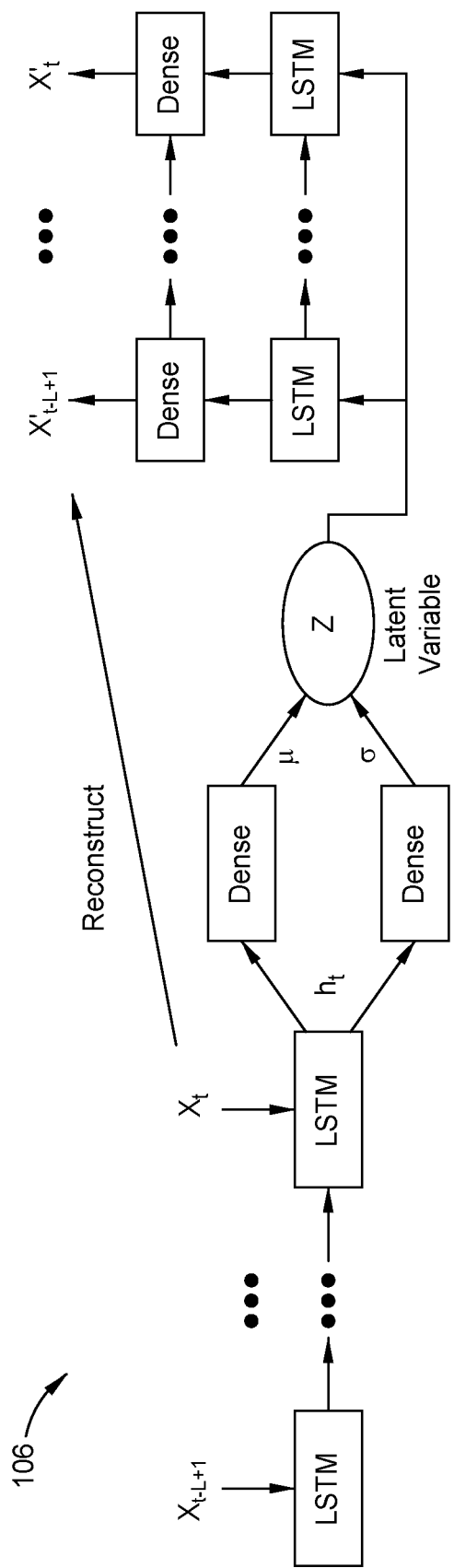
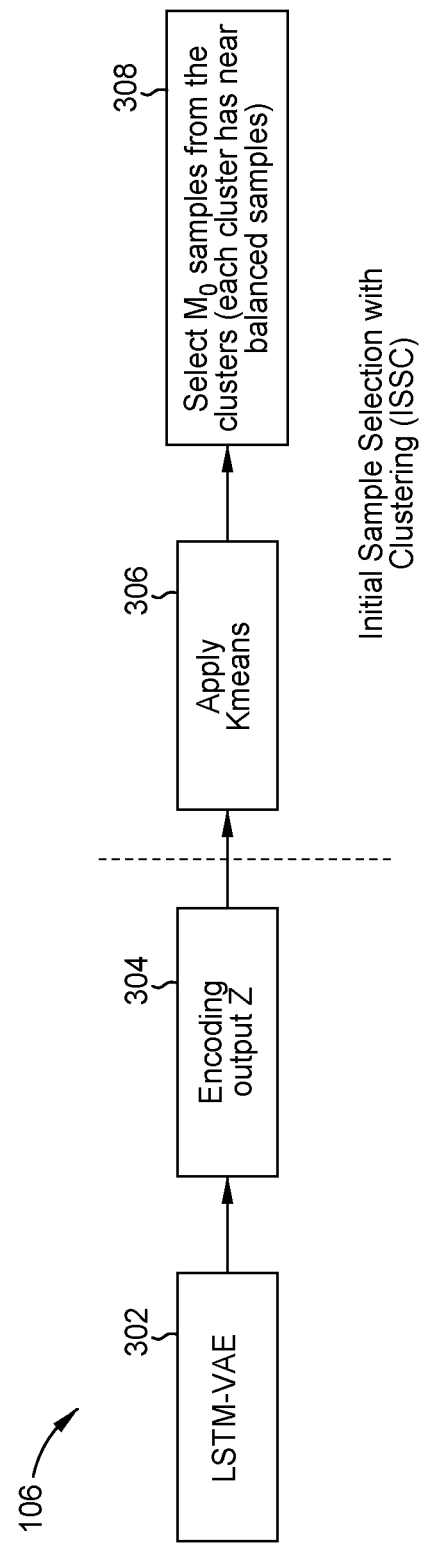
FIG. 3A
LSTM-VAE
FIG. 3B
Initial Sample Selection with Clustering (ISSC)

SELECTING A SUBSET OF TRAINING DATA FROM A DATA POOL FOR A POWER PREDICTION MODEL

CROSS-REFERENCE TO RELATED APPLICATIONS

This application claims priority to and the benefit of U.S. Provisional Patent Application Ser. No. 63/110,261, entitled "Power Estimation Using Input Vectors and Deep Recurrent Neural Network Model," filed Nov. 5, 2020 and U.S. Provisional Patent Application Ser. No. 63/110,262, entitled "Selecting a Small Subset of Training Data from a Large Data Pool for a Power Prediction Model," filed Nov. 5, 2020, both which are incorporated herein by reference in their entirety.

TECHNICAL FIELD

The present disclosure relates to a machine learning application on electronic design automation.

BACKGROUND

An important step in the design of an electrical circuit is estimating the power consumption of the electrical circuit. If an electrical circuit consumes too much power, then the design for the electrical circuit should be changed to reduce its power consumption. Conventional power estimation techniques take excessively long time to estimate power for large designs and even more so when the number of required simulation cycles are large. Machine learning based approaches offer an attractive alternative. A machine learning application may predict power consumption based on waveforms at the input and internal nodes of an electrical circuit. But, if the waveforms are long (e.g. billions or trillions of cycles), it becomes impractical or unmanageable to generate labels (e.g., power values) for training samples due to time and space issue.

Selecting a smaller set of input data (e.g., waveforms) for training may address some of the time and space issues. Random selection of a small subset of samples from a large pool, however, is likely to generate bias for the model as the selected samples are not likely to be informative, representative, and diverse. For instance, if the selected samples are only <0.1% of the total pool, these samples most likely will be biased (e.g., only include some representative data patterns, not complete patterns).

SUMMARY

According to an embodiment, a method includes generating a plurality of vector sequences based on input signals of an electric circuit design and encoding the plurality of vector sequences. The method also includes clustering the plurality of encoded vector sequences into a plurality of clusters and selecting a set of encoded vector sequences from the plurality of clusters. The method further includes selecting a first set of vector sequences corresponding to the selected set of encoded vector sequences, selecting a second set of vector sequences from the plurality of vector sequences not in the first set of vector sequences, and training a machine learning model to predict power consumption using the first and second sets of vector sequences.

The method may include predicting, using the machine learning model, a power consumption of the electric circuit design based on a set of vector sequences in the plurality of vector sequences that are not in the first and second sets of vector sequences.

Selecting the set of encoded vector sequences may include selecting, from each cluster of the plurality of clusters, a number of encoded vector sequences nearest to a centroid of that cluster.

Selecting the second set of vector sequences may include iteratively selecting, using query-by-committee (QBC), a batch of vector sequences.

Selecting the second set of vector sequences may include selecting two batches of vector sequences, clustering input features of the two batches into a second plurality of clusters, and selecting half of the two batches of vector sequences based on the second plurality of clusters.

Selecting the second set of vector sequences may include selecting, using QBC, two batches of vector sequences, clustering embeddings or hidden representations of the two batches into a second plurality of clusters, and selecting half of the two batches of vector sequences based on the second plurality of clusters.

A total number of the vector sequences in the first and second sets of vector sequences may be less than a total number of vector sequences in the plurality of vector sequences.

Each input vector of the plurality of input vectors may include values of the input signals to the electric circuit design over a cycle period of the electric circuit design.

The method may include generating a plurality of input vectors based on the input signals to the electric circuit design. Each vector sequence of the plurality of vector sequences may include a subset of the plurality of input vectors arranged chronologically.

The method may include determining a power consumption of the electric circuit design for each vector sequence in the set of vector sequences to produce a set of power consumption datapoints. Training the machine learning model may further use the set of power consumption datapoints.

The plurality of vector sequences may be encoded using a neural network.

According to another embodiment, an apparatus includes a memory and a hardware processor communicatively coupled to the memory. The hardware processor generates a plurality of vector sequences based on input signals to an electric circuit design and encodes the plurality of vector sequences. The hardware processor also clusters the plurality of encoded vector sequences into a plurality of clusters and selects a set of encoded vector sequences from the plurality of clusters. The hardware processor further selects a first set of vector sequences corresponding to the selected set of encoded vector sequences, selects a second set of vector sequences from the plurality of vector sequences not in the first set of vector sequences, and trains a machine learning model to predict power consumption using the first and second sets of vector sequences.

The hardware processor may predict, using the machine learning model, a power consumption of the electric circuit design based on a set of vector sequences in the plurality of vector sequences that are not in the first and second sets of vector sequences.

Selecting the set of encoded vector sequences may include selecting, from each cluster of the plurality of clusters, a number of encoded vector sequences nearest to a centroid of that cluster.

Selecting the second set of vector sequences may include iteratively selecting, using QBC, a batch of vector sequences.

Selecting the second set of vector sequences may include selecting two batches of vector sequences, clustering input features of the two batches into a second plurality of clusters, and selecting half of the two batches of vector sequences based on the second plurality of clusters.

According to another embodiment, a non-transitory computer readable medium includes software instructions that, when executed, cause a processor to perform an operation including generating a plurality of vector sequences based on input signals to an electric circuit design and clustering the plurality of vector sequences into a plurality of clusters. The operation also includes selecting a first set of vector sequences from the plurality of clusters, selecting a second set of vector sequences from the plurality of vector sequences not in the first set of vector sequences, and training a machine learning model to predict power consumption using the first and second sets of vector sequences.

The operation may include predicting, using the machine learning model, a power consumption of the electric circuit design based on a set of vector sequences in the plurality of vector sequences that are not in the first and second sets of vector sequences.

Selecting the set of encoded vector sequences may include selecting, from each cluster of the plurality of clusters, a number of encoded vector sequences nearest to a centroid of that cluster.

Selecting the second set of vector sequences may include iteratively selecting, using QBC, a batch of vector sequences.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 3A and 3B illustrate selecting a first set of vector sequences, in accordance with some embodiments of the present disclosure

DETAILED DESCRIPTION

Figure 1:
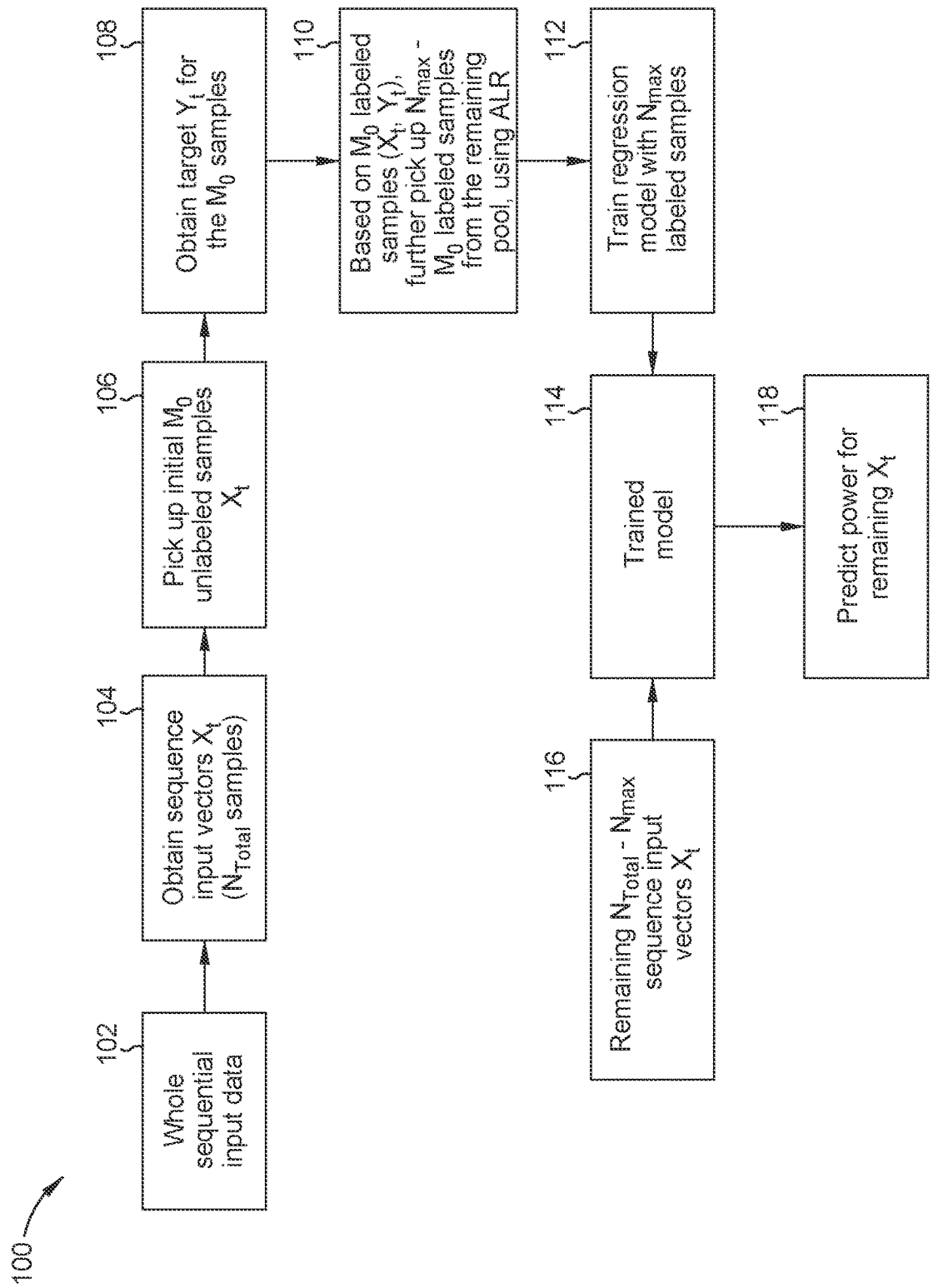
FIG. 1 illustrates a method for estimating the power consumption of an electrical circuit, in accordance with some embodiments of the present disclosure.

Aspects of the present disclosure relate to selecting a subset of training data from a data pool for a power prediction model. Determining or estimating the power consumption of an electrical circuit is an important step in the design of the electrical circuit. Using a machine learning model to predict power consumption may be a quick way to estimate the power consumption of an electrical circuit. Training the machine learning model to predict the power consumption, however, may not be feasible if the input waveforms to the circuit are long, because generating labels (e.g., power values) for these waveforms may be computationally expensive and require more processing resources than available. Selecting a smaller subset of the waveforms to train the machine learning model may reduce the computational complexity, but random selection of a very small subset from a large pool may result in a selection that misses some input patterns. As a result, the selected waveforms may not be diverse and representative of the large pool of waveforms, and training the machine learning model with the selected waveforms effectively exposes the machine learning model to less information, which reduces the accuracy of the machine learning model.

This disclosure describes a method of selecting a more informative, representative, and diverse subset of training samples relative to random selection, in certain embodiments. Generally, machine learning techniques are applied to a pool of data before clustering that pool of data. Similar data may be assigned to the same cluster. A number of training samples are then selected from each cluster. Another machine learning technique is then applied to select additional training samples from the remaining pool until a desired number of training samples have been selected. The selected training samples are then used to train the machine learning model. In this manner, a diverse set of training samples are selected, in particular embodiments. For example, the selected set may include training samples assigned to different clusters, which assures that the selected set includes training samples that are so different from each other that they were assigned to different clusters. As a result, the machine learning model is exposed to a diverse set of training samples, which improves the training and accuracy of the machine learning model, in some embodiments.

In certain embodiments, the method combines an unsupervised clustering method and active learning for regression method to select a small subset of training samples from a large data pool where the selected samples are informative, representative, and diverse. Additionally, the method can be applied to many other machine learning applications in electronic design automation (EDA) for which obtaining label for a sample is computationally expensive. Furthermore, by using a diverse subset of training samples to train the machine learning model, the accuracy of the machine learning model is improved compared to when the subset of training samples is selected randomly, which induces bias to the model as the selected samples are not informative, representative, and diverse.

Figure 8:
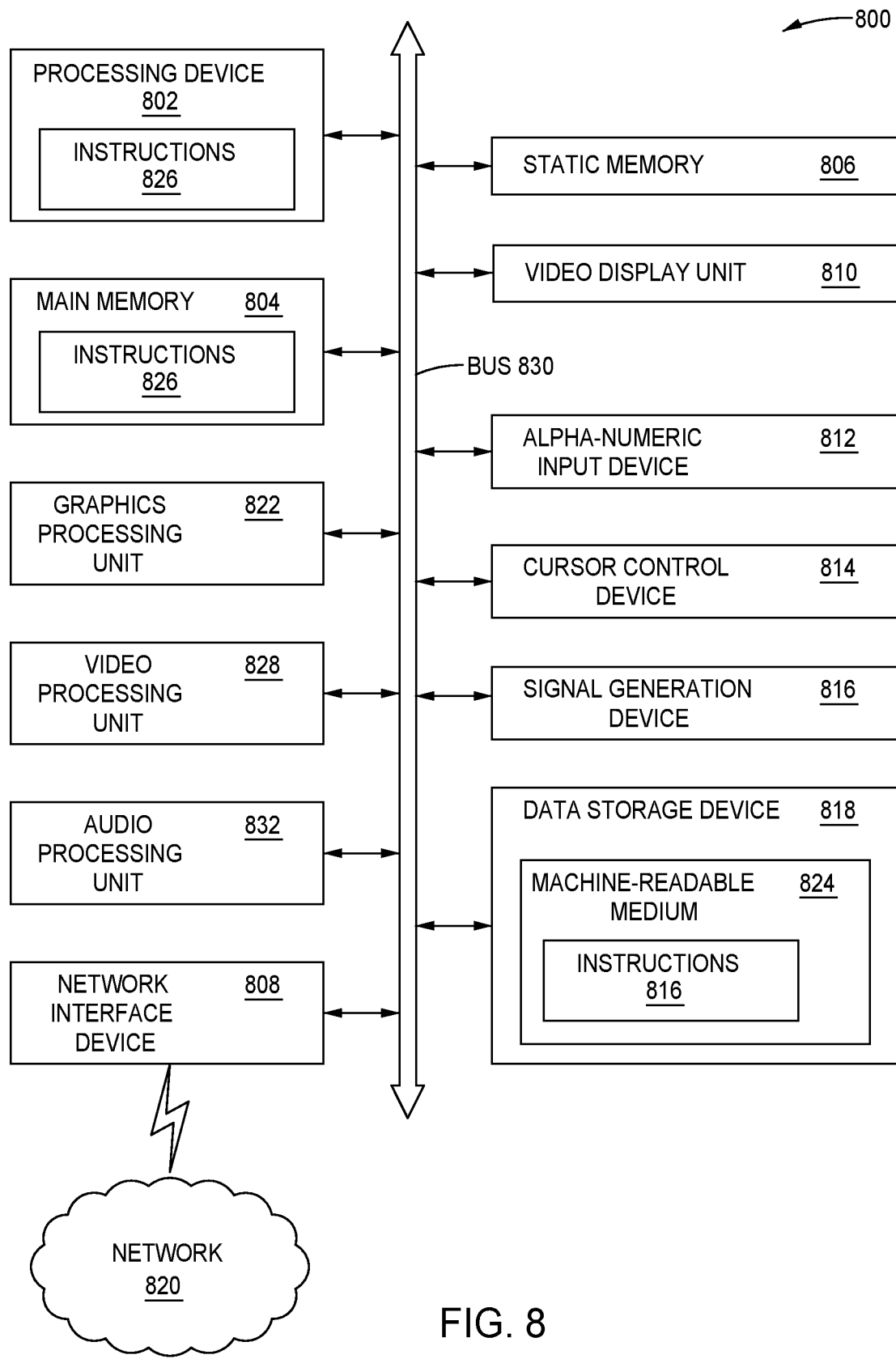
FIG. 8 depicts a diagram of an example computer system in which embodiments of the present disclosure may operate.

FIG. 1 illustrates a method 100 for estimating the power consumption of an electrical circuit. A computer system (e.g., the computer system 800 as shown in FIG. 8) may perform the operations of the method 100, as seen and described with respect to FIGS. 1 through 5. For clarity, the computer system 800 is not illustrated in FIGS. 1 through 5. Generally, the computer system applies various machine learning techniques to a pool of input waveforms to an electrical circuit to select a subset of data with which to train a machine learning model to predict power consumption. In this manner, the computer system selects a more informative, representative, and diverse subset of training samples relative to random selection, in certain embodiments.

The method 100 includes a training portion and a prediction portion. During the training portion, a machine learning model is trained to predict power consumption. During the prediction portion, the machine learning model is applied to predict the power consumption of a circuit.

The training portion includes 102, 104, 106, 108, 110, and 112 and produces a trained model 114. In 102, the computer system receives input data (e.g., waveforms) to an electrical circuit (e.g., an electrical circuit represented in an electrical circuit design). The computer system generates input vectors ($x_t$) based on the input data. In 104, the computer system generates $N_{Total}$ vector sequences ($X_t$) based on the input vectors. Each vector sequence ($X_t$) includes an input vector ($x_t$) at a time t and a certain number of preceding input vectors (e.g., $x_{t-1}$, $x_{t-2}$, etc.). Additional details for 102 and 104 are provided with respect to FIG. 2.

In 106, the computer system selects an initial subset ($M_0$) of training samples from the $N_{Total}$ vector sequences ($X_t$). Generally, the computer system applies various machine learning techniques (e.g., Long Short-Term Memory (LSTM) and variational auto encoding (VAE)) to encode the vector sequences ($X_t$). The computer system then applies K-Means clustering to cluster the encoded vector sequences. The computer system selects a number of encoded vector sequences from each cluster. Then, the computer system forms the initial subset ($M_0$) of vector sequences ($X_t$) using the vector sequences ($X_t$) that correspond to the selected encoded vector sequences. Additional details for 106 are provide with respect to FIGS. 3A and 3B.

In 108, the computer system generates labels (e.g., power consumption datapoints ($Y_t$)) for the electrical circuit based on the initial subset ($M_0$) of vector sequences. Generally, the computer system may input the initial subset ($M_0$) of vector sequences ($X_t$) into a simulation of the electrical circuit to generate the labels. Each vector sequence ($X_t$) in the initial subset ($M_0$) and its corresponding label ($Y_t$) forms a training sample ($X_t$, $Y_t$).

In 110, the computer system iteratively selects additional vector sequences ($X_t$) from the remaining pool of vector sequences (e.g., the vector sequences that were not in the initial subset ($M_0$)) until $N_{Max}$ total vector sequences have been selected. Generally, the computer system applies a machine learning technique (e.g., active learning for regression (ALR)) to select from the remaining vector sequences. The computer system may select additional vector sequences in each iteration using any suitable technique. For example, the computer system may select additional vector sequences ($X_t$) using a Query-by-Committee (QBC) strategy by building groups of power regression models based on the already selected labeled samples ($X_t$, $Y_t$) and then selecting additional vector sequences ($X_t$) with the greatest prediction variances. As another example, the computer system may select additional vector sequences ($X_t$) using the QBC strategy, cluster (e.g., using K-Means) these selected vectors sequences ($X_t$) based on either the input features directly or the embeddings of the vector sequences, and then further select a subset of vector sequences ($X_t$) from the clusters. This process may be repeated until $N_{Max}$ total vector sequences (along with their corresponding labels) have been selected. Additional details for 110 are provided with respect to FIGS. 4A, 4B, and 4C.

In 112, the computer system trains a machine learning model using the $N_{Max}$ selected training samples ($X_t$, $Y_t$). In some embodiments, the computer system trains an existing power prediction model using the training samples ($X_t$, $Y_t$) to produce a trained model 114. Additional details for 112 are provided with respect to FIG. 5.

In 116, the computer system uses the trained model 114 to predict power consumption of the electrical circuit based on the unselected vector sequences ($X_t$). Thus, the computer system uses $N_{Total}$-$N_{Max}$ vector sequences ($X_t$) as input to the trained model 114. In 118, the computer system predicts the power consumption based on these vector sequences ($X_t$).

Figure 2:
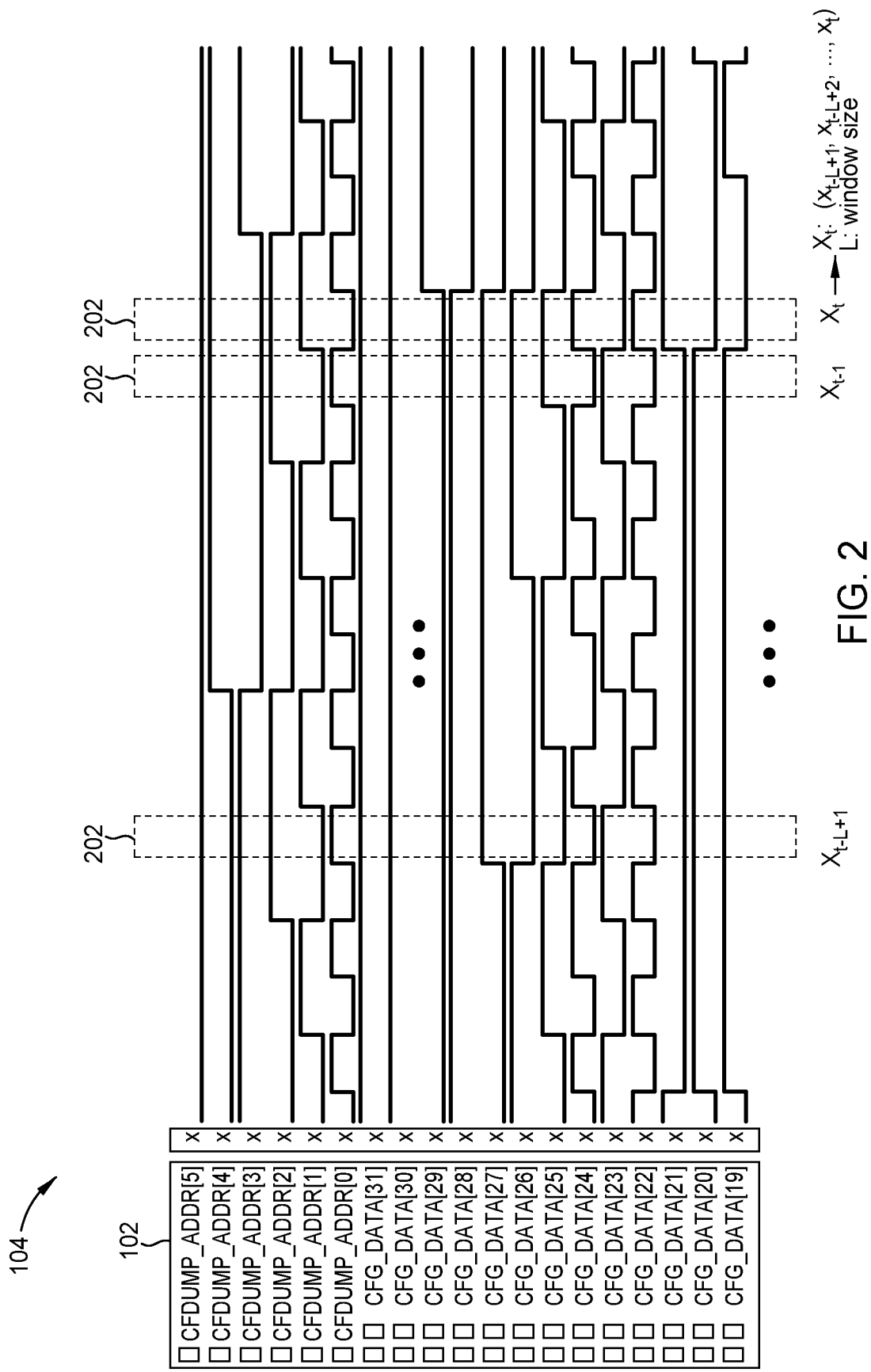
FIG. 2 illustrates generating input vectors and vector sequences, in accordance with some embodiments of the present disclosure.

FIG. 2 illustrates generating input vectors ($x_t$) and vector sequences ($X_t$). As seen in FIG. 2, the computer system captures input signals 102 to an electrical circuit to produce input vectors 202 ($x_t$). Each input signal 102 has a waveform that changes over time. In the example of FIG. 2, the computer system captures the input signals 102 at a time t to produce an input vector 202 ($x_t$), at a time t–1 to produce an input vector 202 ($x_{t-1}$), and so on until a time t–L+1 to produce an input vector 202 ($x_{t-L+1}$), where L is the sequence length/window size. In certain embodiments, the length of time t is a cycle period of the electric circuit. Additionally, as seen in FIG. 2, the input vector may include the values for any number of inputs to the electric circuit. For example, the input vector may include values for input address lines and input data lines of the electric circuit.

Furthermore, the computer system generates vector sequences ($X_t$) based on the input vectors ($x_t$) 202. The computer system processes the input vectors ($x_t$) 202 to generate vector sequences ($X_t$). Each vector sequence ($X_t$) includes an input vector ($x_t$) 202 and a certain number of preceding input vectors ($x_t$) 202. The number of input vectors ($x_t$) 202 in a vector sequence ($X_t$) is referred to as the window size (L). For example, a vector sequence ($X_t$) with a window size (L) of twenty includes the input vectors ($x_t$, $x_{t-1}$, $x_{t-2}$, . . . , $x_{t-18}$, $x_{t-19}$). As a result, a vector sequence ($X_t$) includes a chronological sequence of L input vectors. The computer system may generate any suitable number of vector sequences ($X_t$) with any suitable window size (L).

In some embodiments, the computer system does not generate vector sequences ($X_t$), but rather performs the training steps using the input vectors ($x_t$) and their corresponding power labels ($Y_t$). For example, the computer system may generate the input vectors ($x_t$) based on the input signals and/or some of the internal nodes of an electric circuit. The computer system may then encode the input vectors ($x_t$) (e.g., using VAE) and cluster the encoded input vectors. The computer system may then select a set of encoded input vectors from the clusters. For example, the computer system may select encoded input vectors from each cluster. For each cluster, the computer system may select the encoded input vectors from that cluster randomly or according to any suitable process (e.g., select a number of encoded input vectors that are closest to the centroid of that cluster, which may be a point that defines or is most representative of that cluster). The computer system may then select and/or determine a first set of input vectors ($x_t$) that were used to generate the selected set of encoded input vectors. The computer system may then use ALR to select a second set of input vectors ($x_t$) that are not in the first set of input vectors ($x_t$). The computer system may then train a machine learning model using the first and second sets of input vectors ($x_t$). In this manner, the computer system simplifies the training of the machine learning model.

In some embodiments, the computer system may generate some of the input vectors ($x_t$) based on waveforms at some internal nodes of the electric circuit. An internal node may be a node that connects two or more components of the electric circuit, as opposed to an input node or an output node, which allows the electric circuit to interface with an external component or signal. If the number of internal nodes used to generate input vectors ($x_t$) is kept small, then the computer system can still train a machine learning model using the input vectors ($x_t$) or the corresponding vector sequences ($X_t$) while providing the advantages described above. Importantly, the computer system provides a way to reduce the amount of data used to train the machine learning model even if a subset of the internal nodes are considered.

FIGS. 3A and 3B illustrate selecting a set of vector sequences ($X_t$). FIG. 3A shows the computer system encoding the vector sequences ($X_t$) into a latent variable Z. Generally, the LSTM is a type of neural network that analyzes a sequence of information (e.g., a time sequence such as vector sequences ($X_t$)) to make predictions and determinations. In the context of the present disclosure, the LSTM analyzes a sequence of information provided by an electrical circuit (e.g., the vector sequences ($X_t$)) and effectively determines both the state and history/context of the circuit (e.g., how the circuit or the circuit inputs have changed over time). The VAE is a generative model which learns the latent distribution of the samples (encoding) such that the samples can be reconstructed (decoding) from the learned latent distribution.

The LSTM may first be used to obtain an embedding (hidden feature) of the vector sequences ($X_t$). The VAE is then used to obtain a latent representation (Z) of the vector sequences ($X_t$). In some embodiments, LSTM is not used to encode the vector sequences ($X_t$), and only VAE is used. FIG. 3B shows the computer system selecting an initial subset ($M_0$) of vector sequences. In 302 and 304, the computer system uses LSTM and VAE to produce an encoding output (Z), as discussed with respect to FIG. 3A. In 306, the computer system clusters the encoded vector sequences (e.g., using K-Means clustering on the latent representation (Z)). The number of clusters may correspond to the number of different input patterns (pattern may refer to the hidden features of input sequences, and the same patterns may yield the same outputs). Any suitable number of clusters can be chosen (like 20 or more classes). In some embodiments, the number can be determined by silhouette coefficient, which may be a measure of how similar an encoded vector sequence is to its cluster compared to other clusters. During the clustering, encoded vector sequences that are similar to each other are grouped into the same cluster, and encoded vector sequences that are different from each other are grouped into different clusters. As a result, selecting encoded vector sequences from different clusters may ensure that the vector sequences ($X_t$) used to generate those selected encoded vector sequences are not similar to one another. In 308, the computer system selects a subset of the encoded vector sequences ($M_0$ samples) from the clusters such that selected sample numbers from each cluster are as balanced as possible. The computer system may select a number of encoded vector sequences from each cluster that are nearest to the centroid of that cluster. Then, the computer system select the vector sequences ($X_t$) corresponding to the selected encoded vector sequences and generate labels (e.g., power consumption datapoints ($Y_t$)) using a simulation of the electrical circuit based on the corresponding vector sequences ($X_t$).

In some embodiments, 302 and 304 are not performed. Instead, the vector sequences ($X_t$) are clustered in 306 and $M_0$ samples are selected directly from the clusters.

Figure 4A:
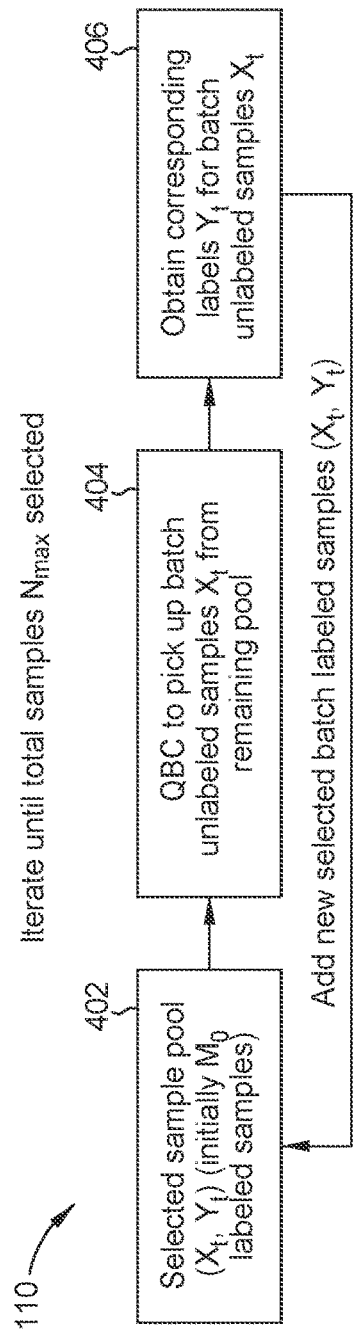
FIGS. 4A, 4B, and 4C illustrate examples of selecting a second set of vector sequences, in accordance with some embodiments of the present disclosure.
Figure 4B:
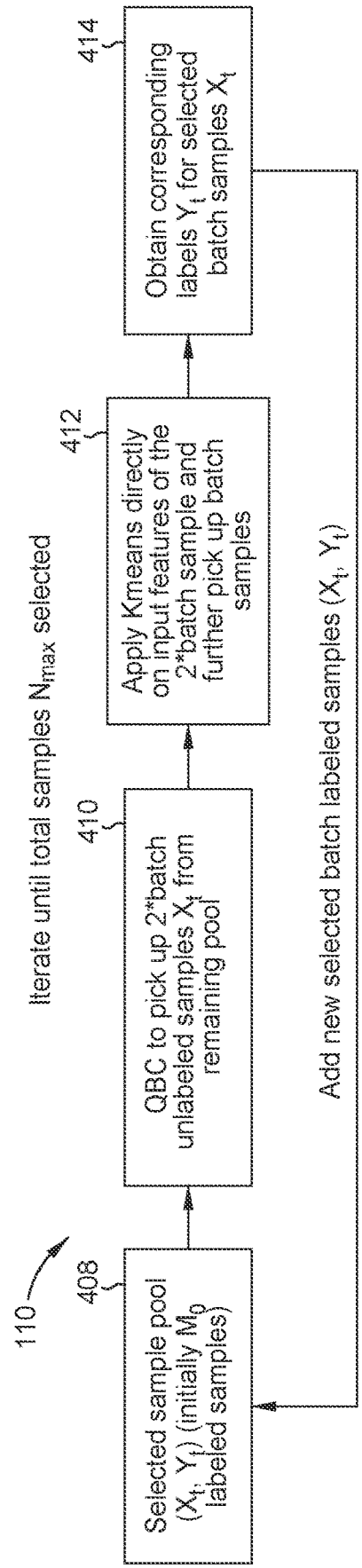
Figure 4C:
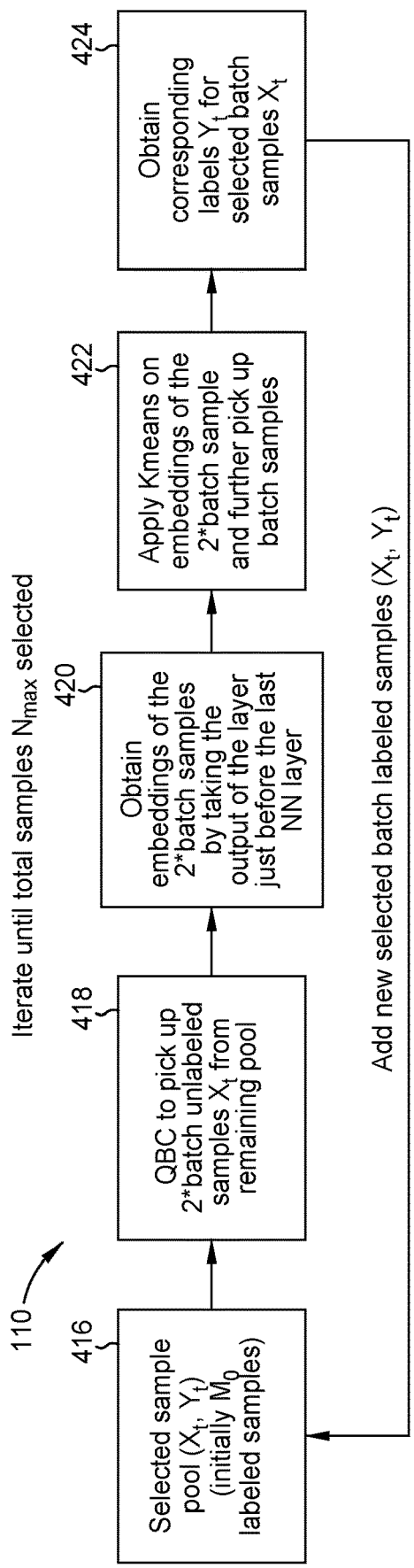

FIGS. 4A, 4B, and 4C illustrate examples of selecting additional vector sequences ($X_t$). Generally, the computer system may supplement the initial $M_0$ selected vector sequences with additional selected vector sequences to form a more robust training set. The computer system may apply a machine learning technique (e.g., ALR) to select additional vector sequences ($X_t$) from the remaining vector sequences ($X_t$). During ALR, the algorithm can actively query labels for some selected unlabeled samples and leverage the labeled samples (build machine learn model) to predict remaining unlabeled samples.

FIG. 4A illustrates an example of selecting another set of vector sequences. In 402, the initial pool for selected samples is prepared with $M_0$ labeled samples selected after 308. In 404, the computer system uses QBC to a select batch of vector sequences ($X_t$) from the remaining pool of vector sequences ($X_t$) (e.g., the pool of vector sequences ($X_t$) that were not in the initial subset ($M_0$)). The QBC strategy is to first build P different regression models based on the existing selected labeled samples. The P different models may be built using one regression model to train on P groups of bootstrapped samples (bootstrapping from existing selected labeled samples). After P models are trained, they are used to predict the label for each vector sequence ($X_t$) remaining in the pool. The variance of P predictions (on the same $X_t$) illustrates the prediction uncertainty on the input vector sequence ($X_t$). The vector sequences ($X_t$) with the maximum variances are then selected. In 406, the computer system generates labels ($Y_t$) for the selected batch samples ($X_t$). The newly selected labeled samples ($X_t$, $Y_t$) are then added to the selected sample pool in 402, which are then used for the next iteration of sample selection. The computer system may repeat 402, 404, and 406 until a sufficient number ($N_{Max}$) of vector sequences (along with their labels) have been selected.

FIG. 4B illustrates another example of selecting another/second set of vector sequences. In 408, the pool for selected samples is prepared with initial $M_0$ labeled samples selected after 308, which is same as 402. In 410, the computer system uses QBC and labeled samples from 408 to select 2*batches of vector sequences ($X_t$) from the remaining pool of vector sequences ($X_t$).

In 412, the computer system clusters the two batches of vector sequences (e.g., using K-Means) and then further selects partial (usually half) samples from the clusters. These partial samples in each cluster should be as balanced as possible (e.g., the selected sample number in each cluster should be similar). In each cluster, the selected number of vector sequences may be those that are closest to the centroid of the cluster. In the example of FIG. 4B, the computer system selects half of the samples from the two batches (equivalent to one batch of samples). If the number of clusters is equal to half of the samples from the two batches, then the computer system simply selects one sample from each cluster (e.g., the sample nearest the centroid of each cluster). In 414, the computer system generates labels ($Y_t$) for the selected batch samples ($X_t$), which is same as 406. The newly selected labeled samples ($X_t$, $Y_t$) are then added to the selected sample pool in 408, which are then used for the next iteration of sample selection. The computer system may repeat 408, 410, 412 and 414 until a sufficient number ($N_{Max}$) of vector sequences (along with their labels) have been selected.

FIG. 4C illustrates another example of selecting a second set of vector sequences. 416 and 418 are the same as 408 and 410, which may use the selected labeled samples and QBC to select two batches of vector sequences ($X_t$) from the remaining pool of vector sequences ($X_t$). In 420, the computer system uses LSTM to obtain embeddings or hidden representations of the two batches of samples by taking the hidden output of the layer preceding the final output layer of the regression neural network (NN) model. For power prediction, the regression model uses LSTM, so the embedding or hidden representation is the hidden state output from the LSTM.

In 422, the computer system clusters the two batches of vector sequences (e.g., using K-Means) based on their embeddings or hidden representations, and then further selects only half of samples. 422 is similar to 412, except that in 422, the computer system uses the hidden representation of vector sequences for unsupervised clustering. In 424, the computer system generates labels ($Y_t$) for the selected batch samples ($X_t$), which is the same as 406. The newly selected labeled samples ($X_t$, $Y_t$) are then added to the selected sample pool in 416, which are then used for the next iteration of sample selection. The computer system may repeat 416, 418, 420, 422 and 424 until a sufficient number ($N_{Max}$) of vector sequences (along with their labels) have been selected.

Figure 5:
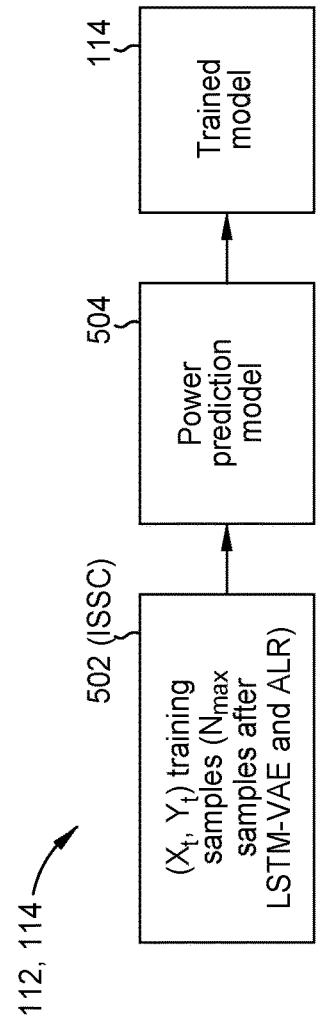
FIG. 5 illustrates training a machine learning model, in accordance with some embodiments of the present disclosure.

FIG. 5 illustrates training a machine learning model. In 502, the computer system uses the $N_{Max}$ training samples ($X_t$, $Y_t$) to train a power prediction model 504. In certain embodiments, the power prediction model 504 may be an existing model. Training the power prediction model 504 produces a trained model 114. The computer system may then use the trained model 114 to predict power consumption.

Figure 6:
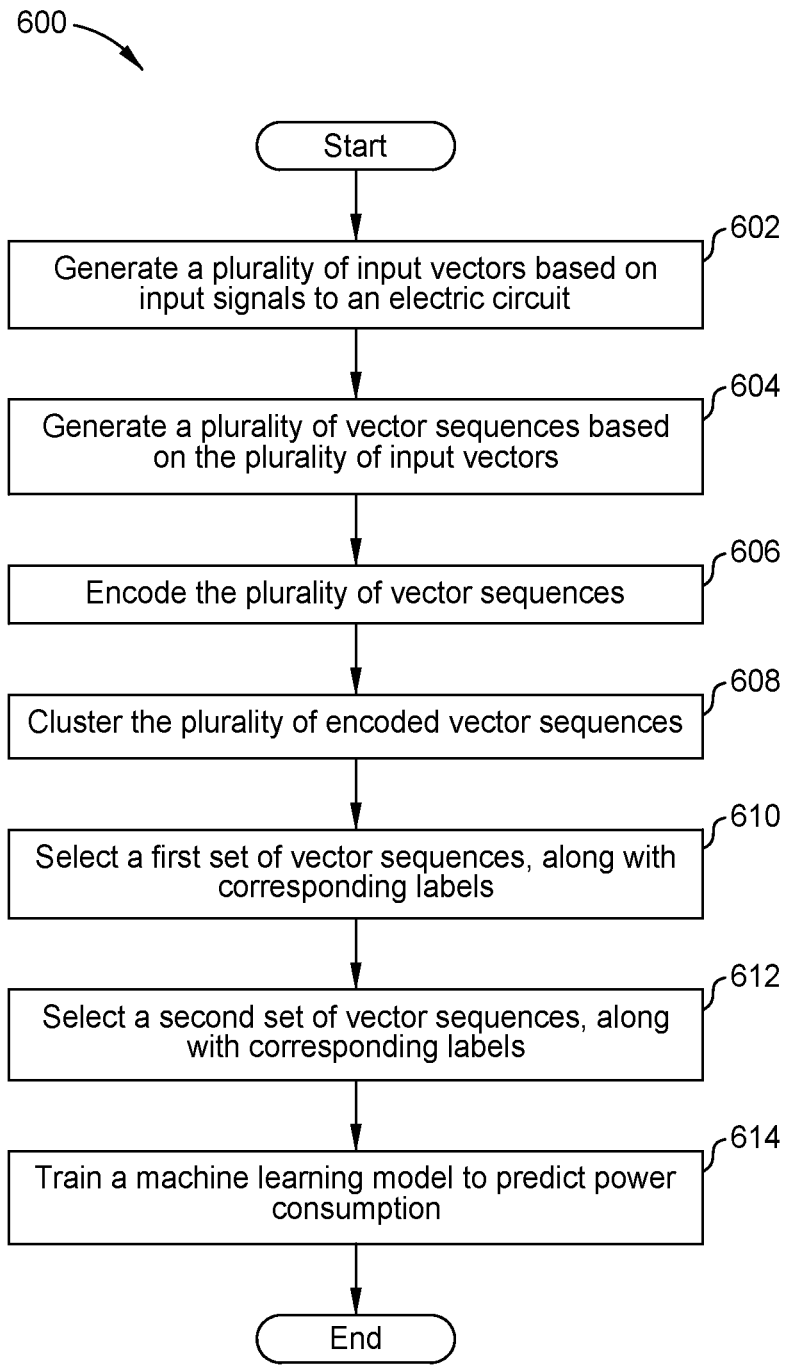
FIG. 6 is a flowchart of a method for sample selection and training of a machine learning model, in accordance with some embodiments of the present disclosure.

FIG. 6 is a flowchart of a method 600 for training a machine learning model. In particular embodiments, the computer system performs the method 600. Performing the method 600 results in a training set that is more informative, representative, and diverse and that reduces the bias in the trained model 114.

In 602, the computer system generates a plurality of input vectors 202 ($x_t$) based on input signals 102 to an electric circuit. The computer system may capture the input signals 102 to the electrical circuit to produce input vectors 202 ($x_t$). Each input signal 102 has a waveform that changes over time.

In 604, the computer system generates a plurality of vector sequences ($X_t$) based on the plurality of input vectors 202 ($x_t$). Each vector sequence ($X_t$) of the plurality of vector sequences ($X_t$) may include a subset of the plurality of input vectors ($x_t$) arranged chronologically. The number of input vectors 202 vectors ($x_t$) in a vector sequence ($X_t$) may be determined based on a window size (L).

In 606, the computer system encodes the plurality of vector sequences ($X_t$). The computer system may use LSTM and VAE to encode the plurality of vector sequences ($X_t$). In 608, the computer system clusters the plurality of encoded vector sequences (e.g., using K-Means clustering). In 610, the computer system selects a first set of vector sequences. The computer system may first select a set of encoded vector sequences from the clusters and then select the first set of vector sequences ($X_t$) corresponding to the selected set of encoded vector sequences. The selected sample number in each cluster is as balanced as possible, and the selected samples in each cluster may be those samples that are nearest to the centroid of that cluster. The computer system then generates labels $Y_t$ (e.g., power consumptions) for the first set of vector sequences ($X_t$).

In 612, the computer system selects a second set of vector sequences. The computer system may select a set of vector sequences ($X_t$) from the remaining pool of vector sequences ($X_t$) (e.g., the vector sequences ($X_t$) not in the first set of vector sequences ($X_t$)). The computer system may use different ALR methods for sample selection. For example, the computer system may use QBC strategy to iteratively select batches of vector sequences ($X_t$) from the remaining pool. As another example, the computer system may first use QBC to select two batches of samples from the remaining pool, apply unsupervised clustering (e.g. K-Means) directly on the input features of two batches of samples or on the embeddings of the two batches of samples, and further choose half of the samples from the clusters. The selected sample number in each cluster is as balanced as possible, and the selected samples in each cluster may be those samples that are nearest to the centroid of each cluster. After selecting the batch samples, the computer system generates labels $Y_t$ (e.g., power consumptions) based on these batch samples. The selected batch labeled samples are then added for the next ALR iteration for further data selection. This process (of batch sample selection) may continue until the computer system has selected a desired number of vector sequences ($X_t$) (e.g., $N_{Max}$).

In 614, the computer system trains a machine learning model to predict power consumption using the selected labeled samples (e.g., the first and second sets of vector sequences ($X_t$) and their corresponding labels ($Y_t$)).

One of skill in the art will appreciate that the disclosed processes for training a machine learning model can be applied in any number of contexts other than training a machine learning model to predict the power consumption of an electrical circuit. For example, the disclosed training process may be used to train any machine learning model that makes predictions based on input vectors or vector sequences of data. The training process generally selects a subset of the available data (e.g., through clustering and ALR) to train the machine learning model.

Figure 7:
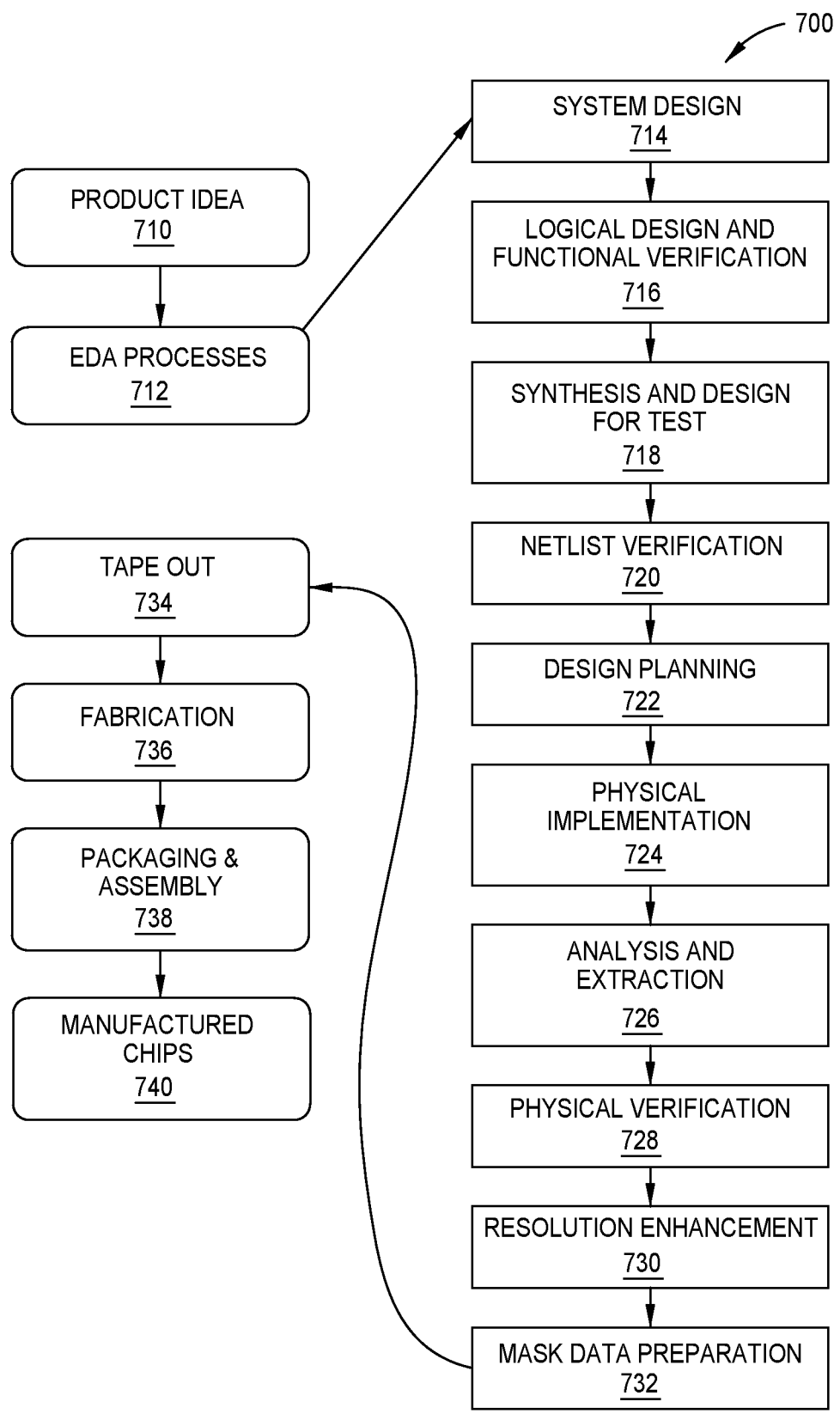
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 7.

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
generating a plurality of vector sequences based on input signals to an electric circuit design;
encoding the plurality of vector sequences;
clustering the plurality of encoded vector sequences into a plurality of clusters;
selecting a set of encoded vector sequences from the plurality of clusters;
selecting a first set of vector sequences corresponding to the selected set of encoded vector sequences;
selecting a second set of vector sequences from the plurality of vector sequences not in the first set of vector sequences; and
training, by a processing device, a machine learning model to predict power consumption using the first and second sets of vector sequences.

2. The method of claim 1, further comprising predicting, using the machine learning model, a power consumption of the electric circuit design based on a set of vector sequences in the plurality of vector sequences that are not in the first and second sets of vector sequences.

3. The method of claim 1, wherein selecting the set of encoded vector sequences comprises selecting, from each cluster of the plurality of clusters, a number of encoded vector sequences nearest to a centroid of that cluster.

4. The method of claim 1, wherein selecting the second set of vector sequences comprises iteratively selecting, using query-by-committee (QBC), a batch of vector sequences.

5. The method of claim 1, wherein selecting the second set of vector sequences comprises:
selecting two batches of vector sequences;
clustering input features of the two batches into a second plurality of clusters; and
selecting half of the two batches of vector sequences based on the second plurality of clusters.

6. The method of claim 1, wherein selecting the second set of vector sequences comprises:
selecting, using query-by-committee, two batches of vector sequences;
clustering embeddings or hidden representations of the two batches into a second plurality of clusters; and
selecting half of the two batches of vector sequences based on the second plurality of clusters.

7. The method of claim 1, wherein a total number of the vector sequences in the first and second sets of vector sequences is less than a total number of vector sequences in the plurality of vector sequences.

8. The method of claim 1, further comprising generating a plurality of input vectors based on the input signals to the electric circuit design, wherein each input vector of the plurality of input vectors comprises values of the input signals to the electric circuit design over a cycle period of the electric circuit design.

9. The method of claim 1, further comprising generating a plurality of input vectors based on the input signals to the electric circuit design, wherein each vector sequence of the plurality of vector sequences comprises a subset of the plurality of input vectors arranged chronologically.

10. The method of claim 1, further comprising determining a power consumption of the electric circuit design for each vector sequence in the first set of vector sequences to produce a set of power consumption datapoints, wherein training the machine learning model further uses the set of power consumption datapoints.

11. The method of claim 1, wherein the plurality of vector sequences are encoded using a neural network and an encoder.

12. A system comprising:
a memory; and
a hardware processor communicatively coupled to the memory, the hardware processor configured to:
generate a plurality of vector sequences based on input signals to an electric circuit design;
encode the plurality of vector sequences;
cluster the plurality of encoded vector sequences into a plurality of clusters;
select a set of encoded vector sequences from the plurality of clusters;
select a first set of vector sequences corresponding to the selected set of encoded vector sequences;
select a second set of vector sequences from the plurality of vector sequences not in the first set of vector sequences; and
train a machine learning model to predict power consumption using the first and second sets of vector sequences.

13. The system of claim 12, wherein the hardware processor is further configured to predict, using the machine learning model, a power consumption of the electric circuit design based on a set of vector sequences in the plurality of vector sequences that are not in the first and second sets of vector sequences.

14. The system of claim 12, wherein selecting the second set of vector sequences comprises iteratively selecting, using query-by-committee, a batch of vector sequences.

15. The system of claim 12, wherein selecting the second set of vector sequences comprises:
selecting two batches of vector sequences;
clustering input features of the two batches into a second plurality of clusters; and
selecting half of the two batches of vector sequences based on the second plurality of clusters.

16. The system of claim 12, wherein selecting the second set of vector sequences comprises:
selecting, using query-by-committee, two batches of vector sequences;
clustering embeddings or hidden representations of the two batches into a second plurality of clusters; and
selecting half of the two batches of vector sequences based on the second plurality of clusters.

17. A non-transitory computer readable medium comprising software instructions that, when executed, cause a processor to perform an operation comprising:
generating a plurality of vector sequences based on input signals to an electric circuit design;
clustering the plurality of vector sequences into a plurality of clusters;
selecting a first set of vector sequences from the plurality of clusters;
selecting a second set of vector sequences from the plurality of vector sequences not in the first set of vector sequences; and
training a machine learning model to predict power consumption using the first and second sets of vector sequences.

18. The non-transitory computer readable medium of claim 17, the operation further comprising predicting, using the machine learning model, a power consumption of the electric circuit design based on a set of vector sequences in the plurality of vector sequences that are not in the first and second sets of vector sequences.

19. The non-transitory computer readable medium of claim 17, wherein selecting the second set of vector sequences comprises iteratively selecting, using query-by-committee, a batch of vector sequences.

* * * * *